United States Patent [19]

Klosowski et al.

[11] Patent Number: 4,772,675

[45] Date of Patent: Sep. 20, 1988

[54] METHODS OF IMPROVING SHELF LIFE OF SILICONE ELASTOMERIC SEALANT

[75] Inventors: Jerome M. Klosowski, Monitor Township, Bay County; Michael D. Meddaugh, Midland, both of Mich.

[73] Assignee: Dow Corning Corporation, Midland, Mich.

[21] Appl. No.: 148,196

[22] Filed: Jan. 28, 1988

Related U.S. Application Data

[60] Continuation-in-part of Ser. No. 49,480, Jun. 29, 1987, abandoned, which is a division of Ser. No. 835,814, Mar. 3, 1986.

[51] Int. Cl.$^4$ ............................................. C08G 77/06
[52] U.S. Cl. ........................................ 528/15; 528/17; 528/31; 528/32; 528/33; 528/34; 528/35; 528/901; 556/451; 556/479; 556/457; 556/474; 556/433; 556/434; 556/435
[58] Field of Search ............... 556/451, 479, 457, 474, 556/433, 434, 435; 528/15, 31, 32, 17, 33, 34, 35, 901

[56] References Cited

U.S. PATENT DOCUMENTS

| 3,122,522 | 2/1964 | Brown et al. | 260/46.5 |
| 3,175,993 | 3/1965 | Weyenberg | 528/27 |
| 3,294,739 | 12/1966 | Weyenberg | 260/46.5 |
| 3,334,067 | 8/1967 | Weyenberg | 260/46.5 |
| 3,383,355 | 5/1968 | Cooper | 260/46.5 |
| 3,856,839 | 12/1974 | Smith et al. | 260/429.5 |
| 4,111,890 | 9/1978 | Getson et al. | 260/37 |
| 4,438,039 | 3/1984 | Beers et al. | 260/429.5 |
| 4,599,394 | 7/1986 | Lucas | 528/15 |
| 4,652,624 | 3/1987 | Allen et al. | 528/17 |
| 4,687,829 | 8/1987 | Chaffee et al. | 528/35 |

FOREIGN PATENT DOCUMENTS 0110251 6/1984 European Pat. Off. .
123935A 11/1984 European Pat. Off. .

Primary Examiner—Melvyn I. Marquis
Attorney, Agent, or Firm—Edward C. Elliott

[57] ABSTRACT

The method of this invention produces an elastomeric silicone sealant having an improved shelf life. The sealant comprises an alkoxysilethylene ended polydiorganosiloxane polymer, an alkoxytrialkoxysilane crosslinker, and a titanium catalyst.

6 Claims, No Drawings

METHODS OF IMPROVING SHELF LIFE OF SILICONE ELASTOMERIC SEALANT

This is a continuation-in-part of co-pending application Ser. No. 049,480 filed on June 29, 1987, now abandoned, which is divisional of co-pending application Ser. No. 835,814 filed on Mar. 3, 1986.

BACKGROUND OF THE INVENTION

1. Field of the Invention

This invention relates to a method of producing silicone elastomeric sealants based upon alkoxy functional polymers, alkoxy functional crosslinkers, and titanate catalysts that have improved shelf life in that they do not lose the ability to cure upon exposure to moisture as they are shelf aged.

2. Background Information

One of the methods of producing silicone sealants at the present time is based upon the use of alkoxy endblocked polymers and a titanium based catalyst. Such sealants are stable in the absence of moisture, but cure in the presence of moisture to a silicone elastomer. The distinguishing feature of this system over the older moisture-curing systems is the absence of acidic or corrosive byproducts produced by the curing system.

Experience with this system in commercial use has now disclosed another variable in this system in comparison to the other systems. With all other moisture-curing systems, as the sealant ages in the storage tube, it gradually cures, due to the inevitable reaction with moisture during long storage periods. This gradual cure is manifested in the gradual thickening of the sealant. When use of the over-aged sealant is attempted, the sealant cannot be expelled from the storage tube because it is too viscous or it has completely cured. In contrast to this, the alkoxy-titanate system gradually loses the ability to cure with time of storage. This is particularly undesirable because the sealant can be expelled from the tube into the desired location for sealing without the user being aware that there is anything wrong. It is only after the sealant fails to cure that a problem becomes apparent, and by then it is too late as the sealant is already in place. It is then necessary to physically remove all of the old non-curing sealant and replace it with new. This is a very time consuming and expensive process. Because of this different type of failure mode of the cure system, it became imperative that a method of producing a non-acid, non-corrosive silicone sealant be developed that would not become non-curing upon long time aging.

There are many patents directed to the system of producing silicone sealants based upon the use of alkoxy functional polymers, alkoxy functional crosslinkers, and titanate catalysts. Representative of these is U.S. Pat. No. 3,334,067, issued Aug. 1, 1967, to Weyenberg. Weyenberg discloses a method of making one component room temperature curing siloxane rubber. His compositions are stable in the absence of moisture, but cure upon exposure to moisture. The method comprises mixing in the absence of moisture a hydroxy endblocked siloxane polymer, a silane of the formula R'Si(OR")3 and a beta-dicarbonyl titanium compound.

In U.S. Pat. No. 3,383,355, issued May 14, 1968, Cooper discloses polymers having alkoxy groups bonded to terminal silicon atoms by reacting a hydroxylated organosiloxane polymer with an alkoxy silane in the presence of a suitable catalyst. He discloses that such functional diorganopolysiloxanes having from two to three alkoxy radicals attached to each terminal silicon atom are curable in the presence of moisture and a suitable hydrolysis and condensation catalyst to a rubbery material.

Smith et al., in U.S. Pat. No. 3,856,839, issued Dec. 24, 1974, disclose alkanedioxy titanium chelates which catalyze the cure of a composition which also contains methyltrimethoxysilane and a silanol chain-stopped polydiorganosiloxane fluid. The particular chelated titanium compound is stated to be desirable because it does not cause thickening during the manufacture of the composition as does the previously known titanium compounds.

An improved version of the above compositions is disclosed by Getson et al. in U.S. Pat. No. 4,111,890, issued Sept. 5, 1978, in which the hydrocarbonoxy groups linked to the organopolysiloxane, organosilicon compound and the titanium ester groups are the same. They disclose that previous compositions have a short shelf-life even when kept under substantially anhydrous conditions, and that the longer these compositions are stored, the lower the property profile becomes.

It is disclosed in U.S. Pat. No. 4,438,039, issued Mar. 20, 1984, that the shelf life of some of the commercial compositions was determined by an appearance problem, manifesting itself in the formation of various sizes of crystals ranging from fine sand-like to pellet-like particles. This patent discloses a particular titanium catalyst which does not form nodules upon storage.

None of the prior art as discussed above discloses any solution for the problem of failure to cure after prolonged storage that is discussed above. After a prolonged investigation into the possible causes of such a storage failure, the solution to the problem was discovered. Once the solution to the problem is known, other background information becomes of interest.

U.S. Pat. No. 3,122,522, issued Feb. 25, 1964 to Brown and Hyde discloses a siloxane composition, each molecule of which consists essentially of (1) at least two units of the formula $$[R'(OCH_2CH_2)_cO]_a(R_b)SiZ(R_2)SiO_{0.5}$$

and units of the formula $$R_dSiO_{(4-d)/2}$$

where each a has a value ranging from 2 to 3, each b has a value ranging from 0 to 1, the sum of a and b in any unit (1) is no greater than 3, each c has a value ranging from 1 to 2, each d has a value ranging from 0 to 2, and Z is a divalent hydrocarbon radical of from 2 to 18 inclusive carbon atoms, Z being free of aliphatic unsaturation. Each molecule of the silicone composition has an average of from 1.3 to 2 R groups per silicon atom and there are at least 7 units of $R_dSiO_{(4-d)/2}$ per molecule.

U.S. Pat. No. 3,175,993, issued Mar. 30, 1965 to Weyenberg discloses a composition consisting essentially of the average formula

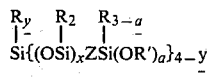

in which each R is free of aliphatic unsaturation, Z is a divalent hydrocarbon radical free of aliphatic unsaturation, y has a value of from 0 to 2 inclusive, x has a value of at least 3 and a has an average value from 2 to 3 inclusive.

Both of the above references teach preparation of the siloxane by reacting siloxanes containing —SiH groups with the appropriate silane containing a monovalent hydrocarbon radical containing an aliphatic or cycloaliphatic group in the presence of a platinum catalyst through the reaction of the —SiH and aliphatic C=C group. This reaction produces the divalent Z radical. Alternatively, the C=C group can be on the siloxane and the —SiH can be on the silane.

European Patent Application No. 0110251, published June 6, 1984, discloses a process for producing alkoxy-terminated polysiloxanes useful to produce room temperature vulcanizing silicone rubber compositions. The process anhydrously reacts a silanol or vinyl siloxane with a polyalkoxy crosslinking agent which is an alkoxy silane in the presence of a platinum catalyst. This alkoxy-terminated polysiloxane can also be mixed with treated filler and condensation catalyst. This application teaches that an alkoxy-terminated polysiloxane having no silethylene linkage at the polymer terminal silicon is equivalent to a polydiorganosiloxane that does contain a trialkoxysilethylene terminal group.

European Patent Application No. 123 935 A, published Nov. 7, 1984 by Totten and Pines, discloses an alkoxysilyl functional silicone including at least one functional group of the formula

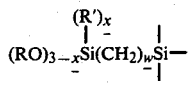

where w is an integer of from 2 to about 20; useful as capable of imparting satisfactory lubricity and other properties such as softness to a variety of textile fabrics.

None of the disclosures in this background information is of any assistance in solving the problem of how to improve the shelf life of silicone sealants that lose the ability to cure upon long time storage in the absence of moisture, said sealants being catalyzed with titanium compounds; because these references do not contain any comments upon the problem.

SUMMARY OF THE INVENTION

This invention relates to a method of producing a silicone elastomeric sealant having improved shelf life, the sealant being based upon alkoxy functional polymers, alkoxy functional crosslinkers, and titanate catalysts. It has been discovered that the shelf life of such sealants can be improved by using a special type of alkoxyfunctional polymer having alkoxysilethylene ends to change the failure mode upon storage.

DESCRIPTION OF THE INVENTION

This invention is a method of improving the shelf life of silicone sealants based upon alkoxy functional polymers, alkoxy functional crosslinkers, and titanate catalysts, the improvement comprising:
(A) mixing in the absence of moisture
(1) 100 parts by weight of a polymer of the formula

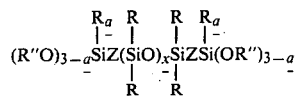

where each R is free of aliphatic unsaturation and is of the group monovalent hydrocarbon, monovalent halohydrocarbon, and monovalent cyanoalkyl radicals of 1 to 18 inclusive carbon atoms, each R" is methyl, ethyl, propyl, or butyl, Z is a divalent hydrocarbon radical or combination of divalent hydrocarbon radicals and siloxane radicals, a is 0 or 1, and x is of a value such that the polymer has a viscosity of from 0.5 to 3000 Pa.s at 25° C.,
(2) from 0.35 to 9.0 parts by weight of a crosslinker of the formula

where R' is methyl or phenyl, R" is methyl, ethyl, propyl, or butyl, and a is 0 or 1, and
(3) from 0.2 to 6.0 parts by weight of titanium catalyst, and
(B) storing the mixture in the absence of moisture.

The method of this invention produces a silicone sealant which does not lose its ability to cure upon exposure to moisture after the sealant is stored for a long period of time in the absence of moisture.

As was noted in the background information, it has been found that silicone elastomer sealants of the type based upon alkoxy endblocked polymers and titanate catalyst lose the ability to cure upon shelf aging. A study was undertaken to determine the cause of the loss of curability in the hope that a solution to the problem could then be determined. A model compound having —Si(Me)(OMe)$_2$ ends was reacted with tetrabutyltitanate (TBT) at 70° C. and the reaction products were analyzed. In this application, Me stands for methyl and Vi stands for vinyl. It was found that there was relatively large amounts of Me$_2$Si(OR)$_2$ where R was either methyl or butyl radical. Further studies showed that this difunctional product could only be produced by degradation of the dialkoxy functional polymer ends with the production of monoalkoxy ended polymer, destroying the model compound. It was known that a monoalkoxy ended polymer would not produce a cure in this type of cure system. Further testing showed that the reaction that was taking place as a reaction of the titanate catalyst with the end siloxy group of the polymer, removing it and its associated organic groups from the polymer and leaving an alkoxy group in its place. A method of preventing this reaction between the titanate and the end siloxy group of the polymer was then sought.

A second model compound was prepared with the formula

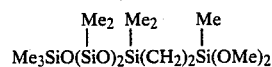

and this compound was combined with TBT and heated at 70° C. for 70 days. At the end of that time there was no Me$_2$Si(OR)$_2$, showing that this could be a solution to the problem, since this model compound remained intact and no degradation had occurred as in the first case.

These tests demonstrated that when the terminal silicon atom in the polymer has three carbon atoms attached as on the one end of this model compound,

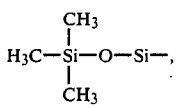

or when the oxygen atom between the penultimate silicon atom and the terminal silicon atom is replaced by a carbon linkage, as at the other end of this model compound, there is no reaction with the titanium catalyst, other than alkoxy exchange.

This discovery was then evaluated in a curable composition in the following manner.

A dimethylhydrogensiloxy endblocked polydimethylsiloxane was mixed with an excess of vinyltrimethoxysilane in the presence of $H_2PtCl_6$ and heated overnight at 100° C. in the absence of moisture. The product was a polymer of the formulation

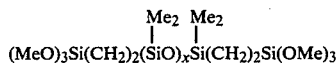

This polymer was combined with TBT and heated at 70° C. for 8 weeks. At various times during this heating period, a sample of the polymer was deposited in an aluminum dish and exposed to the moisture in the air to evaluate the cure. All samples produced a tight, dry cure in 24 hours at room temperature. This showed that this might be a solution to the shelf stability problem.

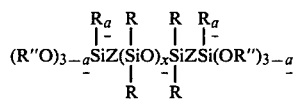

Further work established that silicone sealants could be produced using the method of this invention which had improved shelf life when compared to similar compositions not made with the alkylsilethylene ended polymer.

The method of this invention uses a polymer of the formula

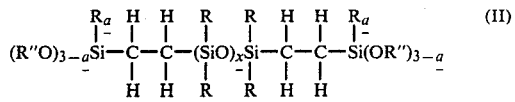

where each R is free of aliphatic unsaturation and is of the group monovalent hydrocarbon, monovalent halohydrocarbon, and monovalent cyanoalkyl radicals of 1 to 18 inclusive carbon atoms, each R" is methyl, ethyl, propyl, or butyl, Z is a divalent hydrocarbon radical or combination of divalent hydrocarbon radicals and siloxane radicals, a is 0 or 1, and x is of a value such that the polymer has a viscosity of from 0.5 to 3000 Pa.s at 25° C. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals which may be represented by the formula

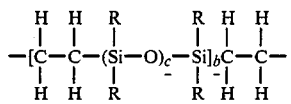

where R is methyl, ethyl, propyl, phenyl, or trifluoropropyl, b is 0 or 1, and c is from 1 to 6. The preferred viscosity is from 1 to 1000 Pa.s at 25° C. Lower viscosities give sealants which are very hard and stiff because of the high amount of crosslinking while higher viscosities give sealants with a very low extrusion rate because of their stiffness.

A more preferred polymer is represented by the formula

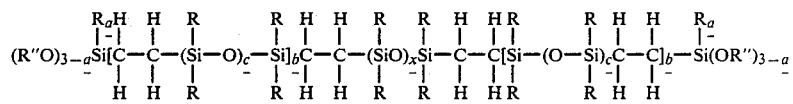

where R is methyl, ethyl, propyl, phenyl, or trifluoropropyl, R" is methyl, ethyl, propy, or butyl, a is 0 or 1, b is 0 or 1, c is from 1 to 6 and x is such that the viscosity is from 0.5 to 3000 Pa.s at 25° C.

A preferred polymer, obtained when b is 0, is of the formula

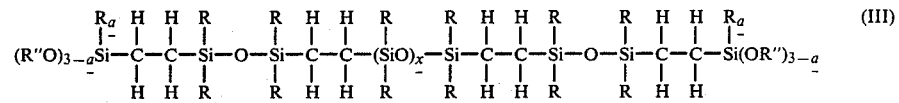

or, when b is 1 and c is 1, is of the formula (III)

where R and R" are as described above. Methyl radical is preferred for R and R". The radicals can be the same or combinations of the above where at least 50 mol percent of the radicals are methyl radicals.

The polymer of the formula (II) may be produced by reacting a hydrogen endblocked siloxane with a silane of the formula

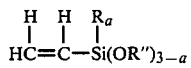

in the presence of a platinum catalyst such as chloroplatinic acid at a temperature of from 30° to 150° C. Methods of making these polymers are taught in U.S. Pat. No. 3,175,993, issued Mar. 30, 1965, to Weyenberg, which is hereby incorporated by reference to show methods of manufacturing polymer of formula (II).

The polymer of formula (III) is manufactured by reacting a vinyl endblocked polydiorganosiloxane with an endcapping composition of the formula

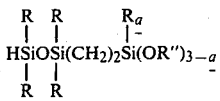

where R is as defined above, using a platinum catalyst to cause the materials to react. This endcapping composition is prepared by reacting $ViR_aSi(OR'')_{3-a}$ with $(R_2HSi)_2O$ in the presence of a platinum catalyst where only one end of the disilane is reacted. This can be done by combining 1 mol of the $ViR_aSi(OR'')_{3-a}$ with greater than 2 mols of the disilane When this mixture is combined with a platinum catalyst, there is a slightly exothermic reaction after a few minutes at room temperature. The color changes from clear to light yellow. A byproduct will be present consisting of product produced by the reaction of $ViSi(OMe)_3$ to both ends of the silane. This byproduct can be left in the material. At a 1 to 2 ratio, there is about 15 percent byproduct produced. If the ratio is changed to 1 to 4 the byproduct drops to about 5 percent. The excess silane is then stripped from the product.

An endcapping composition of the formula

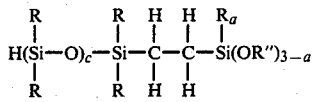

where R is methyl, ethyl, propyl, phenyl, or trifluoropropyl, R'' is methyl, ethyl, propyl, or butyl, a is 0 or 1, and c is 1 to 6 can be produced by a method comprising (A) mixing 1 mol of a composition (a) of the formula

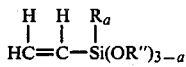

where R is methyl, ethyl, propyl, phenyl, or trifluoropropyl, R'' is methyl, ethyl, propyl, or butyl, and a is 0 or 1, with greater than 2 mols of a composition (b) of the formula

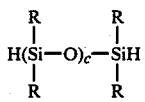

where R is as stated above and c is from 1 to 6, in the presence of a platinum catalyst and allowing to react, then, (B) optionally stripping the excess composition (b) from the product, to give an endcapping composition of the formula as given above. When c is equal to 1, the above method is that described in the previous paragraph and the product obtained is the endcapping composition shown above which is used to produce the polymer of formula (III). A preferred endcapping composition is that obtained when c is equal to 1 and a is equal to 0.

Useful silicone elastomeric sealants are commonly produced with a filler as one of the ingredients. These fillers are well known in the industry. They are added to the mixture to provide reinforcement of the polymer, to produce control of the flow characteristics of the sealant before curing, to control the physical properties of the sealant after curing, and to extend the bulk of the sealant to reduce the cost of the ingredients, as well as to provide other desired characteristics such as opacity.

Reinforcing fillers such as fume silica, precipitated silica, and diatomacious earth are used to give the highest physical strengths to the sealants. Reinforcing fillers are generally recognized as being very fine particles having a surface area from about 50 to 700 m$_2$/g. These fillers may be used with untreated filler surfaces or with treated filler surfaces, the treatment being used to modify the filler surface so that it properly reacts with the polymer and the other ingredients in the sealant. Extending fillers such as titanium dioxide, zirconium silicate, calcium carbonate, iron oxide, ground quartz, and carbon black are commonly used. The amounts of filler used can obviously be varied within wide limits in accordance with the intended use. For example, in some cases the sealant could be used with no filler, but it would have very low physical properties. Reinforcing fillers are commonly used in amounts from about 5 to 50 parts by weight to give the highest physical properties, such as tensile strength. Extending fillers are finely ground in that the average particle size is in the range of from about 1 to 10 micrometers. Extending fillers are used in amounts as high as 500 parts by weight per 100 parts by weight of polymer in some cases.

A crosslinker (2) of the formula $R'_aSi(OR'')_{4-a}$ where R' is methyl or phenyl, R'' is methyl, ethyl, propyl, or butyl, and a is 0 or 1 is added as a moisture scavenger and as a modulus control agent. These alkoxy silanes and their method of manufacture are well known. Preferred are the silanes in which there are three alkoxy groups present, such as methyltrimethoxysilane. The amount of crosslinker preferably is from 0.35 to 9.0 parts by weight, with from 2 to 8 parts most preferred. It is possible to produce useful sealants without using a crosslinker when the polymer of this invention is present because of the functionality of the polymer itself, but from a practical viewpoint, the crosslinker is useful in that it contributes to the excellent shelf life of the sealant. It is also useful in controlling the degree of crosslinking in the cured elastomeric sealant; more of the crosslinker results in a harder, lower elongation elastomer.

The sealants of this invention are cured through the use of a titanium catalyst (3). The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, and bis-(acetylacetonyl)-diisopropyltitanate. The amount of catalyst is from 0.2 to 6.0 parts by weight per 100 parts by weight of polymer (1). Preferred are from 0.5 to 3.0 parts by weight.

The method of this invention is used to produce an improved silicone elastomeric sealant. The preferred method mixes the alkoxysilethylene ended polymer (1) with any filler (if used) until a uniform mixture is obtained. Mixing can be with a low shear mixer or stirrer in the case of the extending fillers or with a high shear mixer such as a dough mixer or 3-roll mill in the case of the reinforcing fillers. After the polymer and filler are mixed, it is desirable to place them in a container and centrifuge them to remove any entrapped air and its accompanying moisture. Then a deaired mixture of crosslinker (2), and titanium catalyst (3) are added in the absence of exposure to moisture. They are thoroughly stirred to give a uniform mixture. The uniform mixture is then preferably deaired, aged 24 hours and again deaired by exposing the mixture to a vacuum to remove any volatiles or moisture from the mixture. The mixture is then sealed into storage containers, sealant tubes for example, to store it until it is to be used.

The composition produced by the method of this invention has an improved shelf life when compared to mixtures made with conventional alkoxy functional polydiorganosiloxanes which do not contain the silethylene group at the ends of the polymer.

When the composition produced by the method of this invention is exposed to moisture, it cures to give an elastomeric silicone. The composition is useful as a sealant material for filling spaces and gaps as in sealing buildings.

The following examples are included for illustrative purposes only and should not be construed as limiting the invention, which is properly set forth in the appended claims. All parts are parts by weight.

EXAMPLE 1

To a 3-necked flask fitted with an air stirrer, condenser, thermometer, and positive nitrogen pressure, was added 1340 g (10 mol) of (Me₂HSi)₂O, 740 g (5 mols) of ViSi(OMe)₃, and 40 drops of chloroplatinic acid complex of divinyltetramethyldisiloxane diluted with dimethylvinylsiloxy endblocked polydimethylsiloxane to provide 0.7 weight percent platinum. The material was then heated to 60° C. for approximately 5 hours and then stripped of excess (Me₂HSi)₂O. The yield was 1362 g of product, approximately 85% pure, of the formula

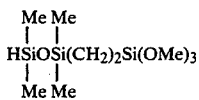

for use as an endcapper.

A mixture was then made in a one gallon glass jug of 45.7 g of the above endcapper, 2283 g of dimethylvinylsiloxy endblocked polydimethylsiloxane having a viscosity of about 10 Pa.s at 25° C., and 1 g of the above platinum catalyst. The materials were mixed well by rolling and aged for approximately 20 hours at room temperature to give a polymer of the formula

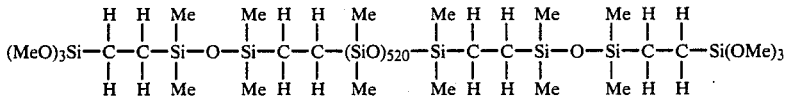

Then 100 parts by weight of the above polymer were mixed, by making 2 passes on a 3-roll mill, with 35 parts by weight of fume silica with a surface area of about 250 m₂/g, said surface treated with trimethylsiloxy units to yield a base. This base was placed under a vacuum for about 3 hours to remove any air, then was placed in sealant cartridges. While in the cartridges, there was added 4 parts by weight MeSi(OMe)₃ and 1 part by weight tetrabutyltitanate and mixed for 4 minutes. Of the 6 tubes prepared, 3 were aged at room temperature and 3 at 70° C. Periodically samples were removed from the tubes, spread out into a sheet and cured for 7 days at room temperature. The cured samples were cut into test bars and the physical properties were measured with the results shown in Table I.

The durometer was measured in accordance with ASTM D2240. the tensile strength and elongation in accordance with ASTM D412, and the tear in accordance with ASTM D624, die 'B'.

TABLE I

| | Durometer | Tensile Strength MPa | Elongation | Tear Strength kN/m |
|---|---|---|---|---|
| Initial | 42 | 4.75 | 580 | 19.2 |
| 4 weeks, R.T. | 42 | 4.93 | 500 | 25.2 |
| 4 weeks, 70° C. | 40 | 5.17 | 530 | 23.5 |
| 8 weeks, R.T. | 41 | 4.20 | 570 | 21.5 |
| 8 weeks, 70° C. | 38 | 5.03 | 640 | 24.5 |

When a similar sealant is prepared in which the polymer is a polymer of the formula

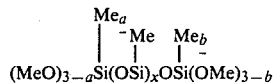

in which a and b are 0 or 1, that has been prepared by mixing in the absence of moisture a hydroxyl endblocked polydimethylsiloxane and methyltrimethoxysilane, the resultant sealant has a shelf life at room temperature of about 6 months, or about 1 week at 70° C. The sealant fails by not curing when exposed to moisture.

EXAMPLE 2

A base was prepared by combining 400 g (100 parts) of dimethylvinylsiloxy endblocked polydimethylsiloxane having a viscosity of about 10 Pa.s at 25° C. and 120 g (30 parts) of fume silica with a surface area of about 250 m₂/g, said surface treated with trimethylsiloxy units by passing the mixture twice through a 3-roll mill. This base (130 g) was placed in a sealant tube and deaired for two hours, then catalyzed by mixing with a combination of 4 g (4 parts) of MeSi(OMe)₃ and 1 g (1 part) of tetrabutyltitanate, 2 g (2 parts) of endcapper of the formula

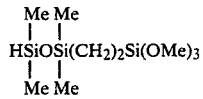

and 0.12 g of chloroplatinic acid complex of divinyltetramethyldisiloxane diluted with dimethylvinylsiloxy endblocked polydimethylsiloxane to provide 0.7 weight percent platinum. After aging in the tube overnight, a sample was spread out into a sheet and cured for 7 days. The properties were Durometer 39, Tensile strength 5.3 MPa, Elongation 536 percent, and Tear strength 24 kN/m.

EXAMPLE 3

A hydrogen endblocked polydimethylsiloxane was prepared by adding 8,436 g (114 mols) of dimethylcyclosiloxane, 39.6 g (0.295 mol) of (Me₂HSi)₂O, and 45 g of acid clay to a 3-necked flask, fitted with an air stirrer, condensers, and thermometer. The mixture was stirred and heated to 60° C. for 24 hours, then cooled, filtered to remove the acid clay catalyst, and stripped of low boilers at 150° C. and 2 mm Hg pressure to yield the hydrogen endblocked polydimethylsiloxane.

This polymer was endcapped by adding to a gallon glass jug 2,100 g of the above polymer, 43.65 g of ViSi(OMe)₃ and 2.1 g of the platinum catalyst described above. The materials were mixed thoroughly by rotating the jug and then aged overnight to allow the reaction to take place. The product was a polymer of the formula

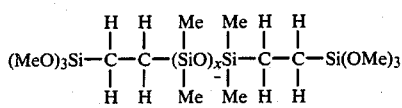

That which is claimed is:

1. A method of producing an endcapping composition comprising
(A) mixing 1 mol of a composition (a) of the formula

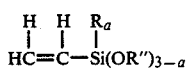

where R is methyl, ethyl, propyl, phenyl, or trifluoropropyl, R″ is methyl, ethyl, propyl, or butyl, and a is 0 or 1, with greater than 2 mols of a composition (b) of the formula

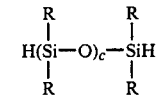

where R is as stated above and c is from 1 to 6, in the presence of a platinum catalyst and allowing to react, then,
(B) optionally stripping the excess composition (b) from the product, to give an endcapping composition of the formula

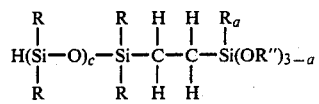

where R is methyl, ethyl, propyl, phenyl, or trifluoropropyl, R″ is methyl, ethyl, propyl, or butyl, a is 0 or 1, and c is 1 to 6.

2. The method of claim 1 in which composition (b) has c equal to 1.
3. The method of claim 2 in in which composition (a) has a equal to 0.
4. The product having the formula,

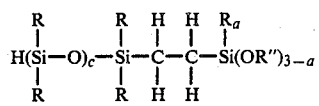

where R is methyl, ethyl, propyl, phenyl, or trifluoropropyl, R″ is methyl, ethyl, propyl, or butyl, a is 0 or 1, and c is 1 to 6.

5. The product as claimed in claim 4 in which c is 1.
6. The product as claimed in claim 5 in which a is 0.

* * * * *